US012700954B2

(12) United States Patent
Jiang

(10) Patent No.: US 12,700,954 B2
(45) Date of Patent: Aug. 4, 2026

(54) METHODS AND APPARATUSES FOR GENERATING STATUS REPORT, SETTING TIMER, AND CONFIGURING INFORMATION

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 308 days.

(21) Appl. No.: 18/288,565

(22) PCT Filed: Apr. 27, 2021

(86) PCT No.: PCT/CN2021/090277
§ 371 (c)(1),
(2) Date: Oct. 26, 2023

(87) PCT Pub. No.: WO2022/226784
PCT Pub. Date: Nov. 3, 2022

(65) Prior Publication Data
US 2025/0080283 A1       Mar. 6, 2025

(51) Int. Cl.
*H04L 1/1829*       (2023.01)
*H04W 28/06*       (2009.01)

(52) U.S. Cl.
CPC ......... *H04L 1/1848* (2013.01); *H04W 28/065* (2013.01)

(58) Field of Classification Search
None
See application file for complete search history.

(56) References Cited

U.S. PATENT DOCUMENTS

2009/0119564 A1*   5/2009   Sagfors ................. H04L 1/1854
                                                        714/748
2012/0082096 A1*   4/2012   Cave ..................... H04W 24/10
                                                        370/328

(Continued)

FOREIGN PATENT DOCUMENTS

CN          110034873 A        7/2019
WO        2019095228 A1        5/2019
WO        2020065469 A1        4/2020

OTHER PUBLICATIONS

International Search. Report of PCT/CN2021/090277 dated Jan. 26, 2022 with English translation, (6p).

(Continued)

*Primary Examiner* — Lonnie V Sweet
(74) *Attorney, Agent, or Firm* — Arch & Lake LLP; Hao Tan; Shen Wang

(57)       ABSTRACT

Methods and apparatuses for generating a status report, setting a timer, and configuring information, and a storage medium. The method for generating a status report includes: determining that a reassembly timer has expired and a status prohibition timer has not started, generating a Radio Link Control (RLC) status report, submitting the RLC status report to a Media Access Control (MAC) layer, and then starting up the status prohibition timer; and during the operation of the status prohibition timer, determining that a new RLC status report has been triggered and a target condition for generating the new RLC status report is met, generating the new RLC status report, and submitting the new RLC status report to the MAC layer.

19 Claims, 9 Drawing Sheets

Determine that a reassembly timer expires and that a status prohibition timer is not started, generate a Radio Link Control (RLC) status report and submit it to a Media Access Control (MAC) layer, and then start the status prohibition timer — 201

During running of the status prohibition timer, determine that a new RLC status report is triggered and a target condition for generating the new RLC status report is met, generate the new RLC status report and submit it to the MAC layer — 202

(56) References Cited

U.S. PATENT DOCUMENTS

2021/0119861 A1      4/2021  Tripathi et al.
2021/0314810 A1 *  10/2021  Kanamarlapudi  .... H04L 1/1671
2022/0150730 A1 *   5/2022  Freda  ................... H04L 1/1812
2022/0322397 A1 *  10/2022  Liu  ................... H04W 72/1273

OTHER PUBLICATIONS

Sequans Communications, "Additional RLC and PDCP aspects for NTN", 3GPP TSG-RAN WG2 Meeting #112-e Elbonia, Nov. 2-13, 2020, R2-2010170, (3p).
Samsung, "Report of [POST113-e][107][NTN] RLC and PDCP Aspects (Samsung)", 3GPP TSG-RAN WG2 #113b-e R2-2104499 Electronic Meeting, Apr. 12-Apr. 20, 2021 Revision of R2-2104286, (16p).
MediaTek Inc, "Delay-tolerant re-transmission mechanisms in NR-NTN", 3GPP TSG RAN WG1 Meeting #97 R1-1906466 Reno, Nevada, USA, May 13-17, 2019, (7p).
First Office Action issued in Application No. 202180001098.0, dated Apr. 26, 2022, (7p).
Sequans Communications, "On RLC t-Reassembly for NTN", 3GPP TSG-RAN WG2 Meeting #113bis-e Elbonia, Apr. 12-Apr. 20, 2021, R2-2103964, Revision of R2-2101518, (5p).

* cited by examiner

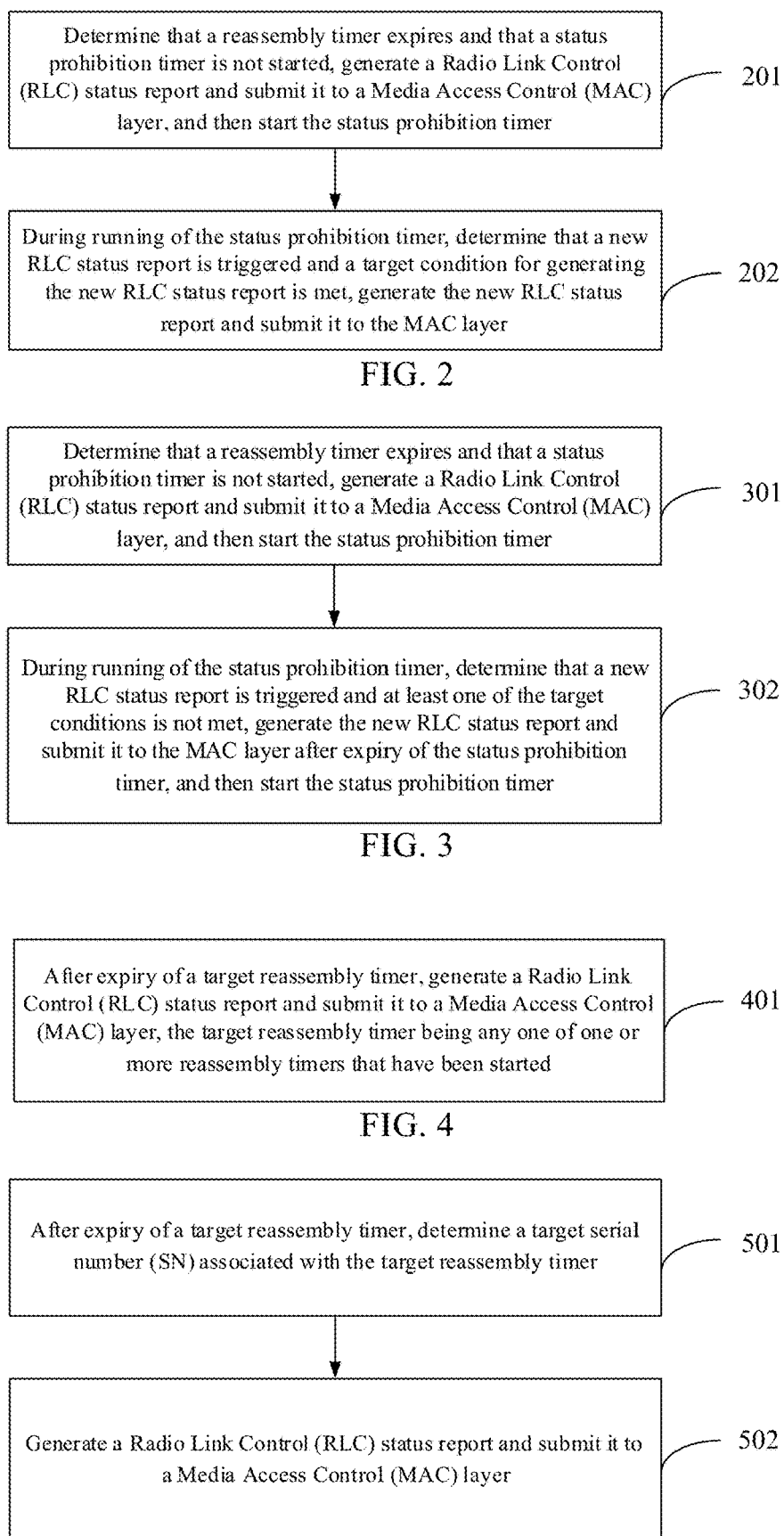

Determine that a reassembly timer expires and that a status prohibition timer is not started, generate a Radio Link Control (RLC) status report and submit it to a Media Access Control (MAC) layer, and then start the status prohibition timer ——— 201

During running of the status prohibition timer, determine that a new RLC status report is triggered and a target condition for generating the new RLC status report is met, generate the new RLC status report and submit it to the MAC layer ——— 202

FIG. 2

Determine that a reassembly timer expires and that a status prohibition timer is not started, generate a Radio Link Control (RLC) status report and submit it to a Media Access Control (MAC) layer, and then start the status prohibition timer ——— 301

During running of the status prohibition timer, determine that a new RLC status report is triggered and at least one of the target conditions is not met, generate the new RLC status report and submit it to the MAC layer after expiry of the status prohibition timer, and then start the status prohibition timer ——— 302

FIG. 3

After expiry of a target reassembly timer, generate a Radio Link Control (RLC) status report and submit it to a Media Access Control (MAC) layer, the target reassembly timer being any one of one or more reassembly timers that have been started ——— 401

FIG. 4

After expiry of a target reassembly timer, determine a target serial number (SN) associated with the target reassembly timer ——— 501

Generate a Radio Link Control (RLC) status report and submit it to a Media Access Control (MAC) layer ——— 502

FIG. 5

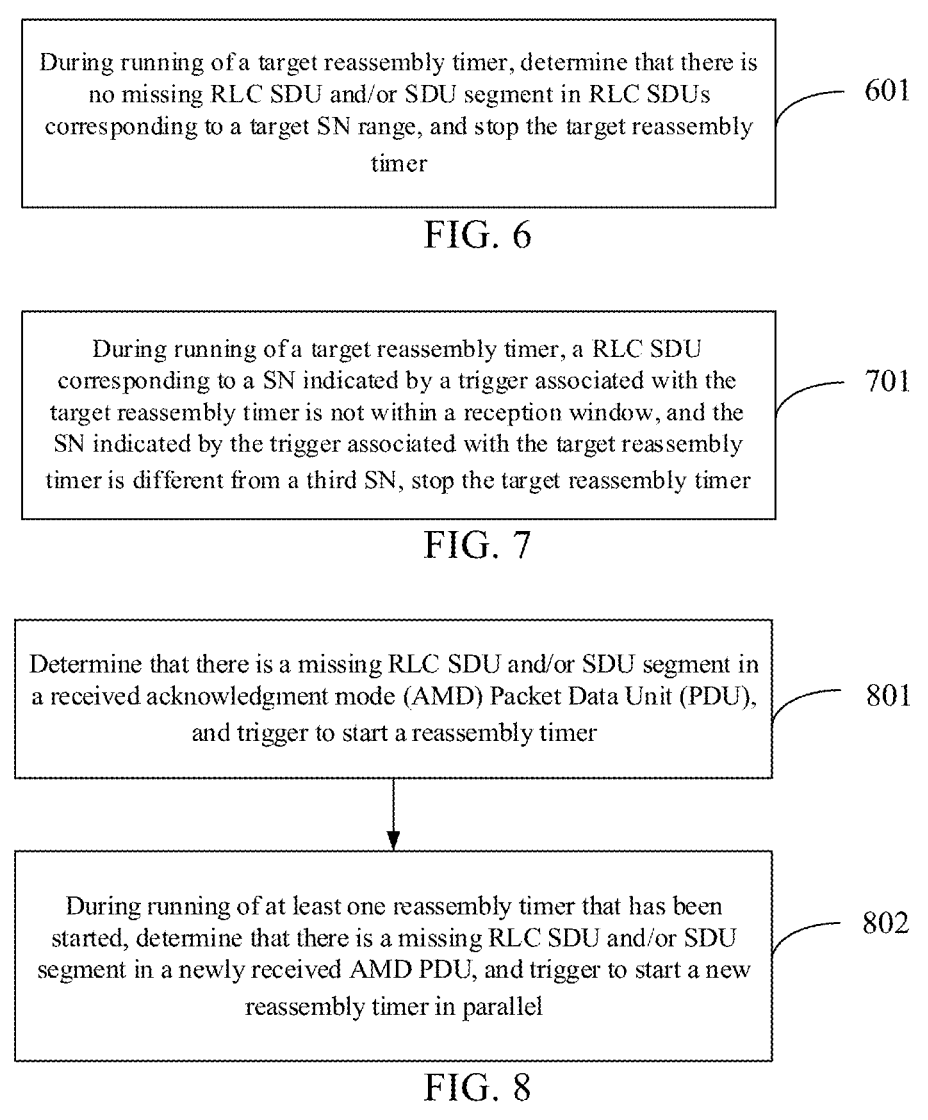

During running of a target reassembly timer, determine that there is no missing RLC SDU and/or SDU segment in RLC SDUs corresponding to a target SN range, and stop the target reassembly timer ⟋— 601

FIG. 6

During running of a target reassembly timer, a RLC SDU corresponding to a SN indicated by a trigger associated with the target reassembly timer is not within a reception window, and the SN indicated by the trigger associated with the target reassembly timer is different from a third SN, stop the target reassembly timer ⟋— 701

FIG. 7

Determine that there is a missing RLC SDU and/or SDU segment in a received acknowledgment mode (AMD) Packet Data Unit (PDU), and trigger to start a reassembly timer ⟋— 801

During running of at least one reassembly timer that has been started, determine that there is a missing RLC SDU and/or SDU segment in a newly received AMD PDU, and trigger to start a new reassembly timer in parallel ⟋— 802

FIG. 8

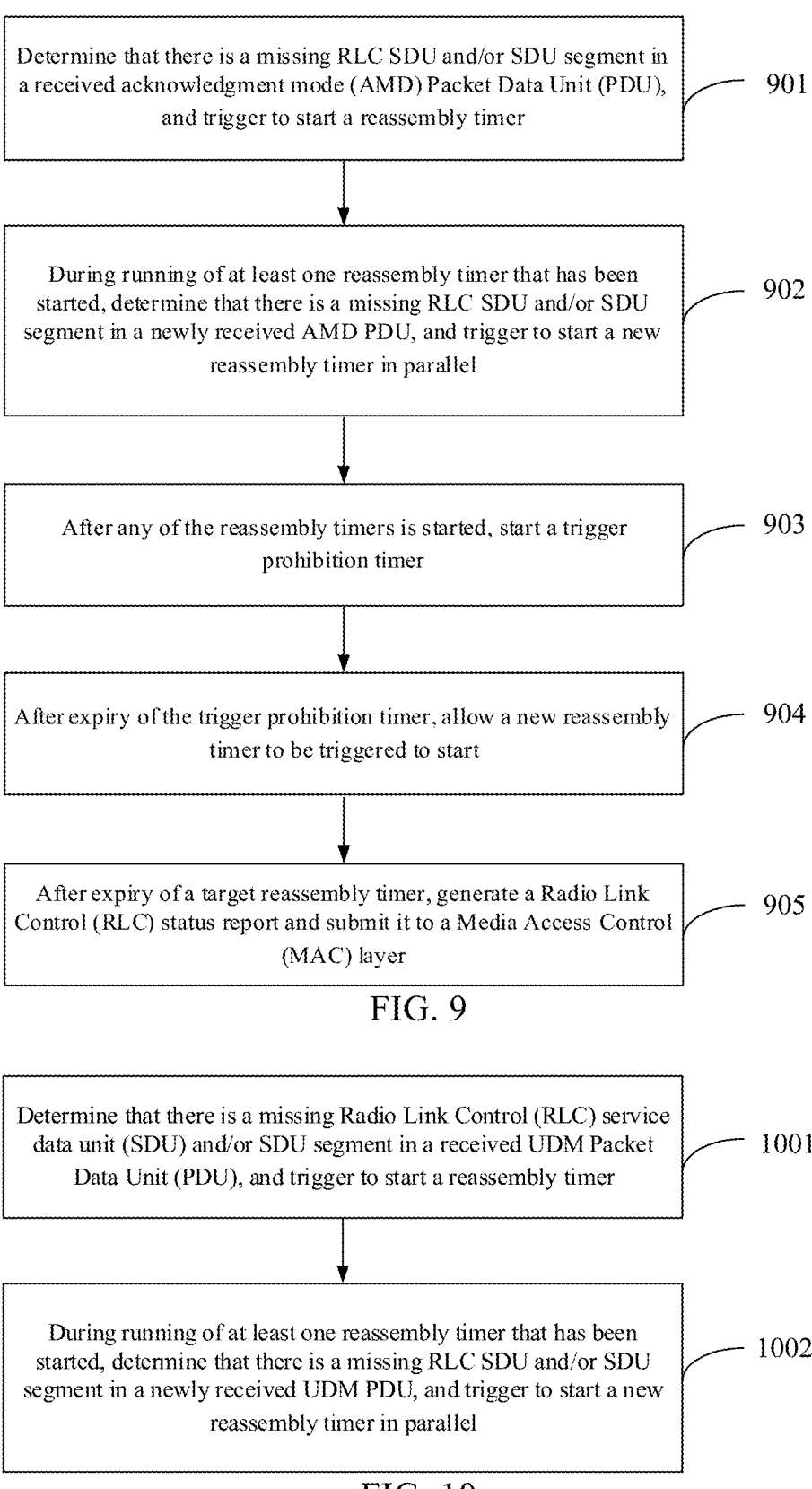

Determine that there is a missing RLC SDU and/or SDU segment in a received acknowledgment mode (AMD) Packet Data Unit (PDU), and trigger to start a reassembly timer — 901

During running of at least one reassembly timer that has been started, determine that there is a missing RLC SDU and/or SDU segment in a newly received AMD PDU, and trigger to start a new reassembly timer in parallel — 902

After any of the reassembly timers is started, start a trigger prohibition timer — 903

After expiry of the trigger prohibition timer, allow a new reassembly timer to be triggered to start — 904

After expiry of a target reassembly timer, generate a Radio Link Control (RLC) status report and submit it to a Media Access Control (MAC) layer — 905

FIG. 9

Determine that there is a missing Radio Link Control (RLC) service data unit (SDU) and/or SDU segment in a received UDM Packet Data Unit (PDU), and trigger to start a reassembly timer — 1001

During running of at least one reassembly timer that has been started, determine that there is a missing RLC SDU and/or SDU segment in a newly received UDM PDU, and trigger to start a new reassembly timer in parallel — 1002

FIG. 10

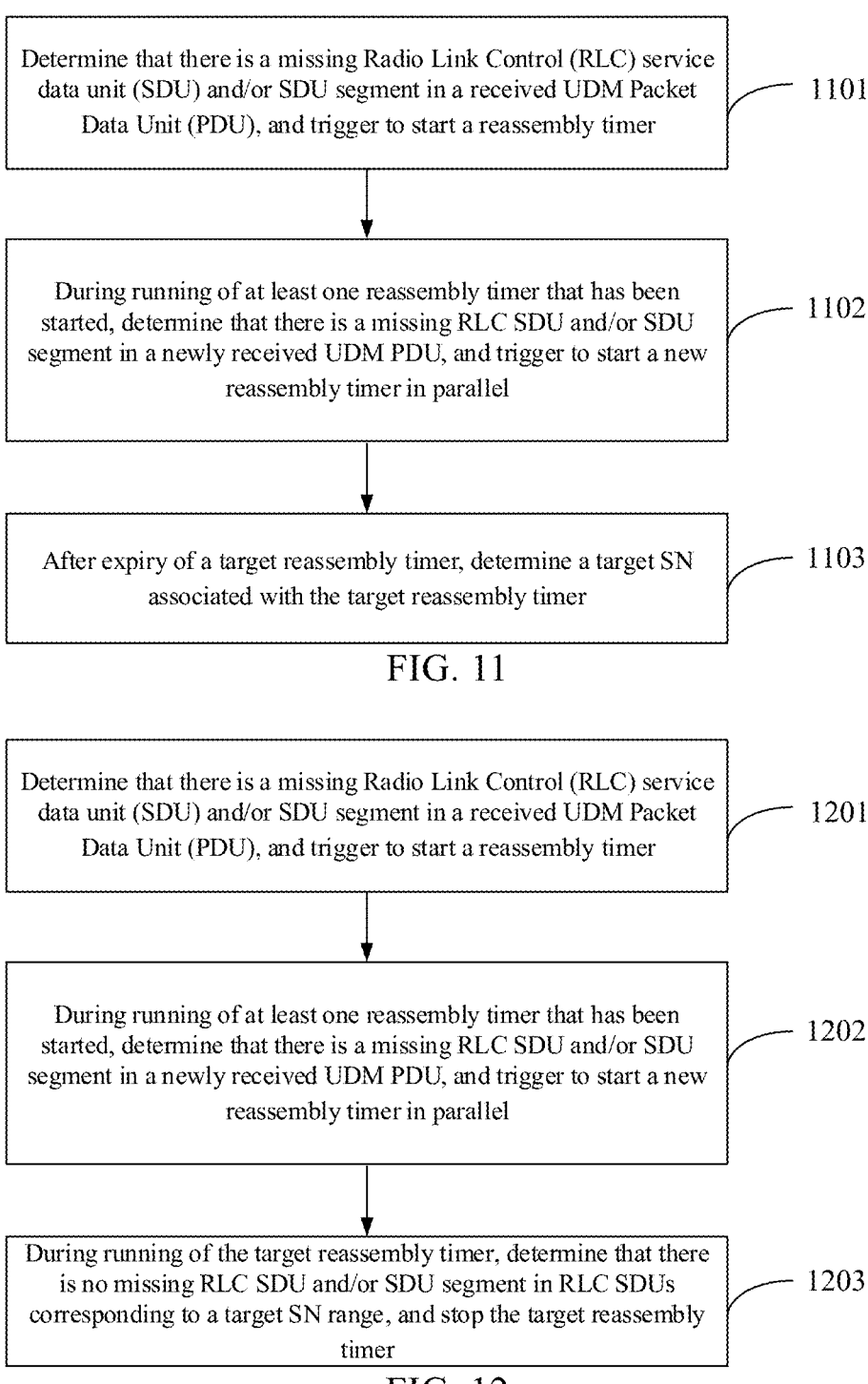

Determine that there is a missing Radio Link Control (RLC) service data unit (SDU) and/or SDU segment in a received UDM Packet Data Unit (PDU), and trigger to start a reassembly timer — 1101

During running of at least one reassembly timer that has been started, determine that there is a missing RLC SDU and/or SDU segment in a newly received UDM PDU, and trigger to start a new reassembly timer in parallel — 1102

After expiry of a target reassembly timer, determine a target SN associated with the target reassembly timer — 1103

FIG. 11

Determine that there is a missing Radio Link Control (RLC) service data unit (SDU) and/or SDU segment in a received UDM Packet Data Unit (PDU), and trigger to start a reassembly timer — 1201

During running of at least one reassembly timer that has been started, determine that there is a missing RLC SDU and/or SDU segment in a newly received UDM PDU, and trigger to start a new reassembly timer in parallel — 1202

During running of the target reassembly timer, determine that there is no missing RLC SDU and/or SDU segment in RLC SDUs corresponding to a target SN range, and stop the target reassembly timer — 1203

FIG. 12

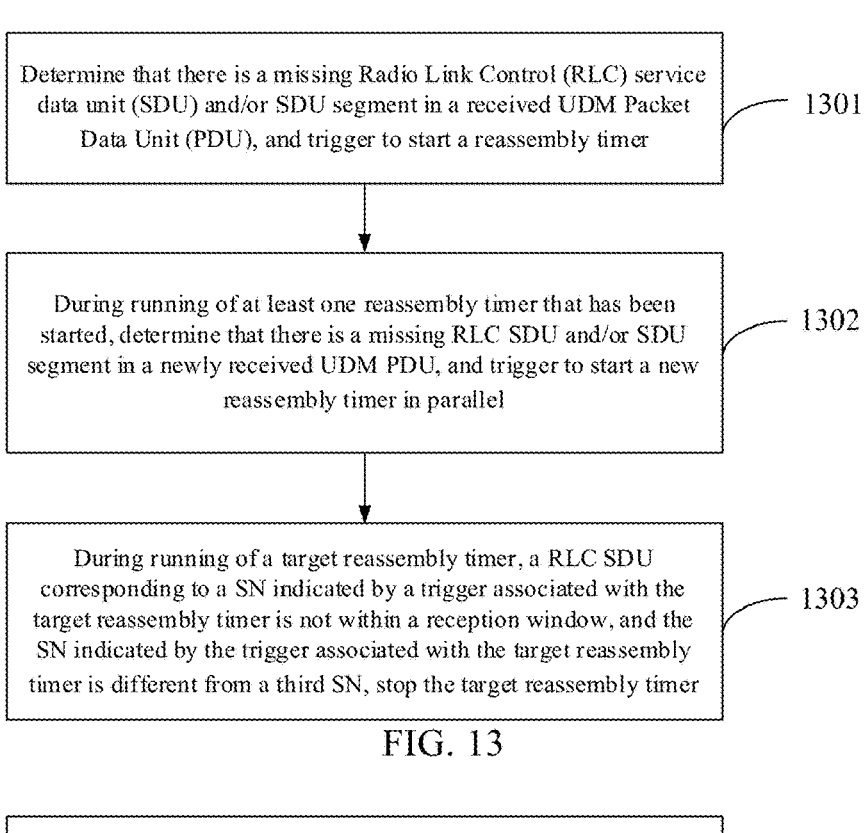

Determine that there is a missing Radio Link Control (RLC) service data unit (SDU) and/or SDU segment in a received UDM Packet Data Unit (PDU), and trigger to start a reassembly timer ⟍ 1301

During running of at least one reassembly timer that has been started, determine that there is a missing RLC SDU and/or SDU segment in a newly received UDM PDU, and trigger to start a new reassembly timer in parallel ⟍ 1302

During running of a target reassembly timer, a RLC SDU corresponding to a SN indicated by a trigger associated with the target reassembly timer is not within a reception window, and the SN indicated by the trigger associated with the target reassembly timer is different from a third SN, stop the target reassembly timer ⟍ 1303

FIG. 13

Configure at least timing duration information of a reassembly timer for a terminal ⟍ 1401

FIG. 14

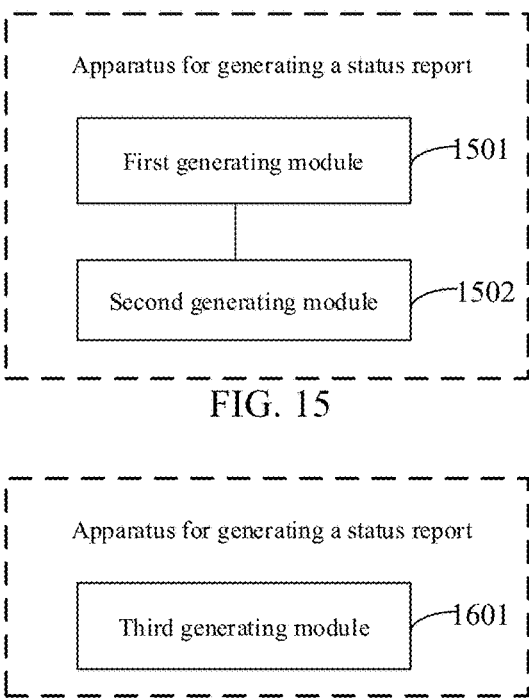

Apparatus for generating a status report

First generating module ⟍ 1501

Second generating module ⟍ 1502

FIG. 15

Apparatus for generating a status report

Third generating module ⟍ 1601

FIG. 16

METHODS AND APPARATUSES FOR GENERATING STATUS REPORT, SETTING TIMER, AND CONFIGURING INFORMATION

CROSS-REFERENCE TO RELATED APPLICATION

The present application is a U.S. National Stage of International Application No. PCT/CN2021/090277, filed on Apr. 27, 2021, the disclosure of which is incorporated herein by reference in its entirety for all purposes.

BACKGROUND

A Non-terrestrial Network (NTN) is an important technology introduced by 5th generation mobile networks (5G), and provides wireless resources through satellites (or unmanned aerial vehicles). In the NTN network, the maximum bidirectional delay between a terminal and a base station can be up to 541.46 milliseconds.

There are two cases where a Radio Link Control (RLC) status report is triggered. One is that it is triggered upon a receiving end receives polling from a sending end, and the other is that it is triggered when the receiving end has a missing Service Data Unit (SDU) and/or SDU segment. For the latter case, when the receiving end detects that there is the missing SDU or SDU segment, it starts a reassembly timer (t-reassembly), and a status report is triggered after expiry of the t-reassembly timer. After the status report is triggered, the terminal will generate the status report and then start a status prohibition timer (t-StatusProhibit). During the running of the t-StatusProhibit timer, the terminal will not generate any status report for a newly triggered status report. In addition, during the running of the t-reassembly after it is started, the receiving end will not trigger to start a new t-reassembly timer due to any new missing SDU and/or SDU segment, so it will not trigger a new status report, and the new missing SDU and/or SDU segment can trigger the t-reassembly only after the t-reassembly expires, thereby triggering the status report.

In order to cope with a large Round-Trip Time (RTT) of the NTN network, the RLC status report can be generated in the cases where a Hybrid Automatic Repeat reQuest (HARQ) is enabled or disabled.

SUMMARY

The present disclosure relates to the field of communications, and in particular to methods and apparatuses for generating a status report, setting a timer, and configuring information.

According to a first aspect of an embodiment of the present disclosure, there is provided a method for generating a status report, the method is used for a terminal and includes: determining that a reassembly timer expires and that a status prohibition timer is not started, generating a Radio Link Control (RLC) status report, submitting the status report to a Media Access Control (MAC) layer, and then starting the status prohibition timer;

during running of the status prohibition timer, determining that a new RLC status report is triggered and a target condition for generating the new RLC status report is met, generating the new RLC status report, and submitting the new RLC status report to the MAC layer.

According to a second aspect of an embodiment of the present disclosure, there is provided a method for generating a status report, the method is used for a terminal and includes:

after expiry of a target reassembly timer, generating a Radio Link Control (RLC) status report and submitting the status report to a Media Access Control (MAC) layer, wherein the target reassembly timer is any one of one or more reassembly timers that have been started.

According to a third aspect of an embodiment of the present disclosure, there is provided a method for setting a timer, the method is used for a terminal and includes:

determining that there is a missing Radio Link Control (RLC) Service Data Unit (SDU) and/or SDU segment in a received Packet Data Unit (PDU) in a target mode, and triggering to start a reassembly timer; and during running of at least one reassembly timer that has been started, determining that there is a missing RLC SDU and/or SDU segment in a newly received PDU in the target mode, and triggering to start a new reassembly timer in parallel.

According to a fourth aspect of an embodiment of the present disclosure, there is provided an apparatus for generating a status report, including:

a processor; and a memory configured to store instructions executable by the processor, wherein the processor is configured to perform the method for generating a status report according to any one of the above first aspect or second aspect.

According to a fifth aspect of an embodiment of the present disclosure, there is provided an apparatus for setting a timer, including:

a processor; and a memory configured to store instructions executable by the processor, wherein the processor is configured to perform the method for setting a timer according to any one of the above third aspect.

The above general description and the following detailed description are only exemplary and explanatory, and should not limit the disclosure.

BRIEF DESCRIPTION OF THE DRAWINGS

The drawings herein are incorporated in and constitute a part of this specification, illustrate embodiments consistent with the present disclosure, and together with the description serve to explain the principles of the present disclosure.

FIG. 2 is a schematic flowchart of a method for generating a status report according to an illustrative embodiment of the present disclosure.

FIG. 3 is a schematic flowchart of another method for generating a status report according to an illustrative embodiment of the present disclosure.

FIG. 4 is a schematic flowchart of another method for generating a status report according to an illustrative embodiment of the present disclosure.

FIG. 5 is a schematic flowchart of another method for generating a status report according to an illustrative embodiment of the present disclosure.

FIG. 6 is a schematic flowchart of another method for generating a status report according to an illustrative embodiment of the present disclosure.

FIG. 7 is a schematic flowchart of another method for generating a status report according to an illustrative embodiment of the present disclosure.

FIG. 8 is a schematic flowchart of another method for generating a status report according to an illustrative embodiment of the present disclosure.

FIG. 9 is a schematic flowchart of another method for generating a status report according to an illustrative embodiment of the present disclosure.

FIG. 10 is a schematic flowchart of a method for setting a timer according to an illustrative embodiment of the present disclosure.

FIG. 11 is a schematic flowchart of another method for setting a timer according to an illustrative embodiment of the present disclosure.

FIG. 12 is a schematic flowchart of another method for setting a timer according to an illustrative embodiment of the present disclosure.

FIG. 13 is a schematic flowchart of another method for setting a timer according to an illustrative embodiment of the present disclosure.

FIG. 14 is a schematic flowchart of an information configuration method according to an illustrative embodiment of the present disclosure.

FIG. 15 is a block diagram of an apparatus for generating a status report according to an illustrative embodiment of the present disclosure.

FIG. 16 is a block diagram of another apparatus for generating a status report according to an illustrative embodiment of the present disclosure.

Figures 17, 18:
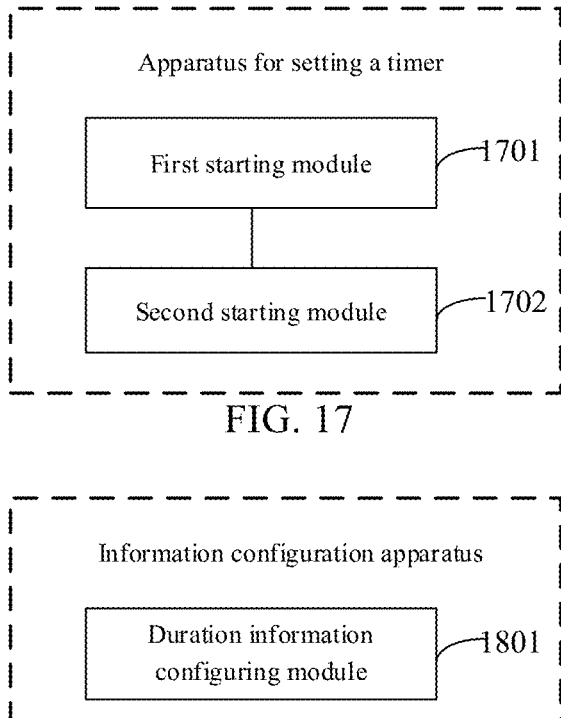

FIG. 17 is a block diagram of an apparatus for setting a timer according to an illustrative embodiment of the present disclosure.

FIG. 18 is a block diagram of an information configuration apparatus according to an illustrative embodiment of the present disclosure.

Figure 19:
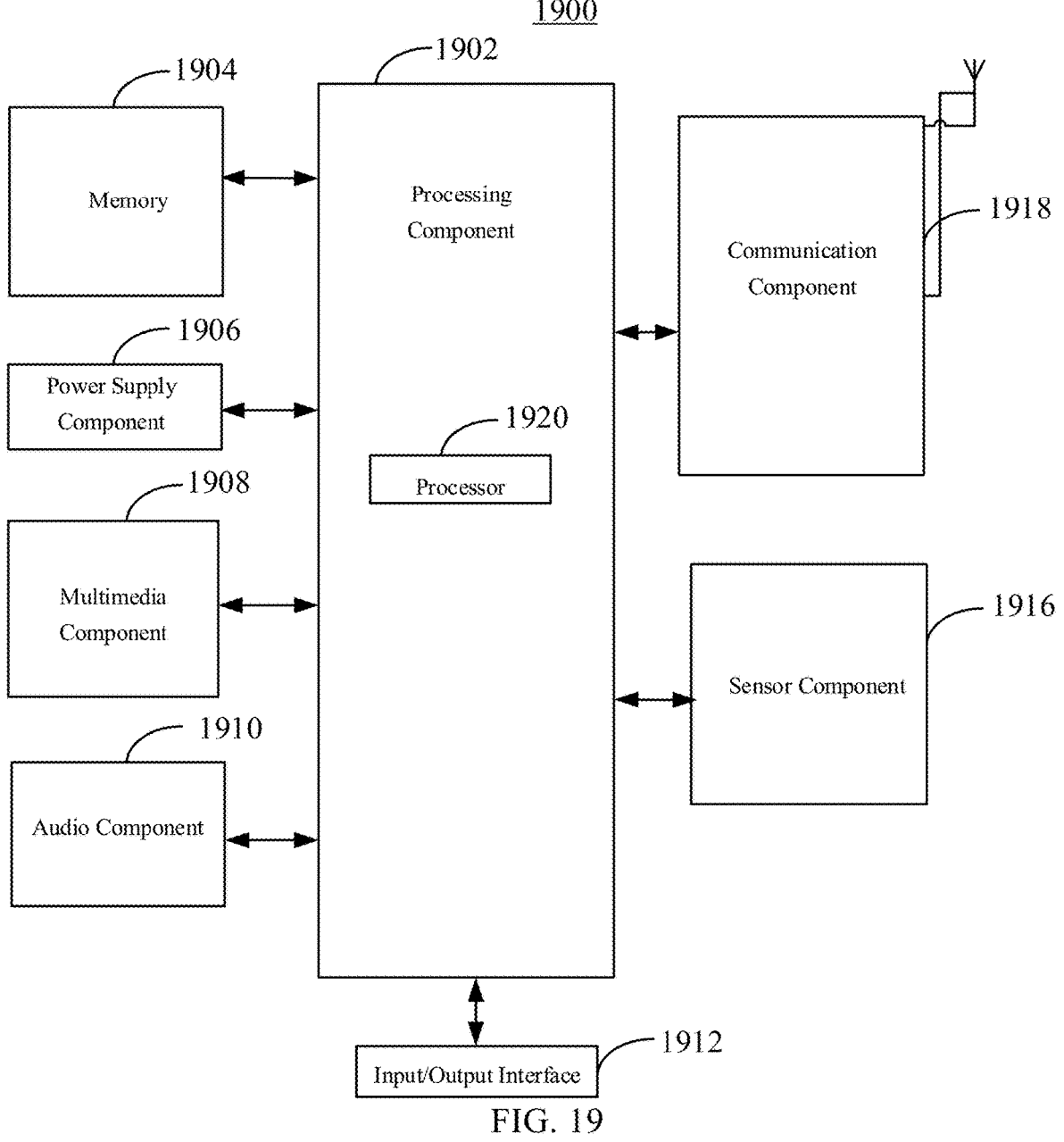

FIG. 19 is a schematic structural diagram of an electronic device according to an illustrative embodiment of the present disclosure.

Figure 20:
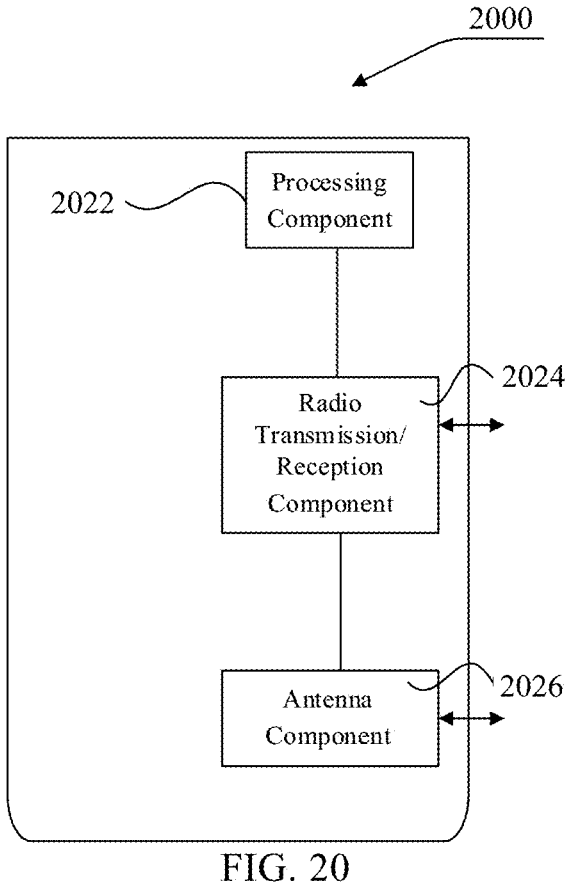

FIG. 20 is a schematic structural diagram of an information configuration apparatus according to an illustrative embodiment of the present disclosure.

DETAILED DESCRIPTION

The illustrative embodiments will be described in detail here, examples of which are illustrated in the accompanying drawings. When the following description refers to the accompanying drawings, the same numerals in different drawings represent the same or similar elements unless otherwise indicated. The implementations described in the following illustrative embodiments do not represent all implementations consistent with the present disclosure. Rather, they are merely examples of devices and methods consistent with some aspects of the present disclosure as detailed in the appended claims.

The terms used in the present disclosure are for the purpose of describing specific embodiments only and are not intended to limit the present disclosure. As used in the present disclosure and the appended claims, the singular forms "a," "an" and "the" are intended to include the plural forms as well, unless otherwise indicated clearly in the context. It will also be understood that the term "and/or" as used herein refers to and includes any and all possible combinations of one or more of the associated items listed.

It should be understood that although the terms first, second, third, etc. may be used in the present disclosure to describe various information, the information should not be limited to these terms. These terms are only used to distinguish information of the same type from each other. For example, without departing from the scope of the present disclosure, the first information may also be called the second information, and similarly, the second information may also be called the first information. Depending on the context, the word "if" as used herein may be interpreted as "when" or "upon" or "in response to determining . . . ."

Figure 1A:
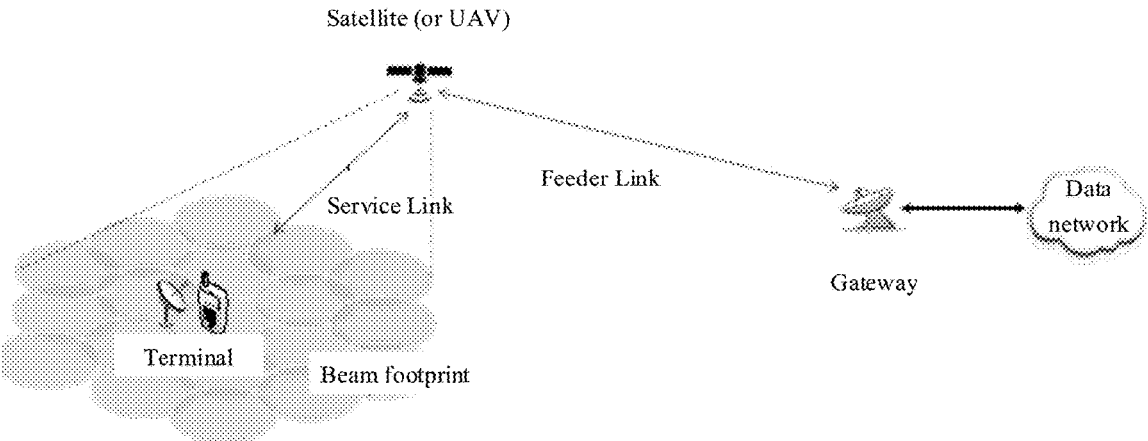
FIG. 1A is a schematic diagram of an NTN communication scenario according to an illustrative embodiment of the present disclosure.

The current NTN communication method is as shown in FIG. 1A.

Depending on the ways in which the satellites process signals, the NTN communications can be divided into a transparent transmission mode and a regeneration mode.

Figure 1B:
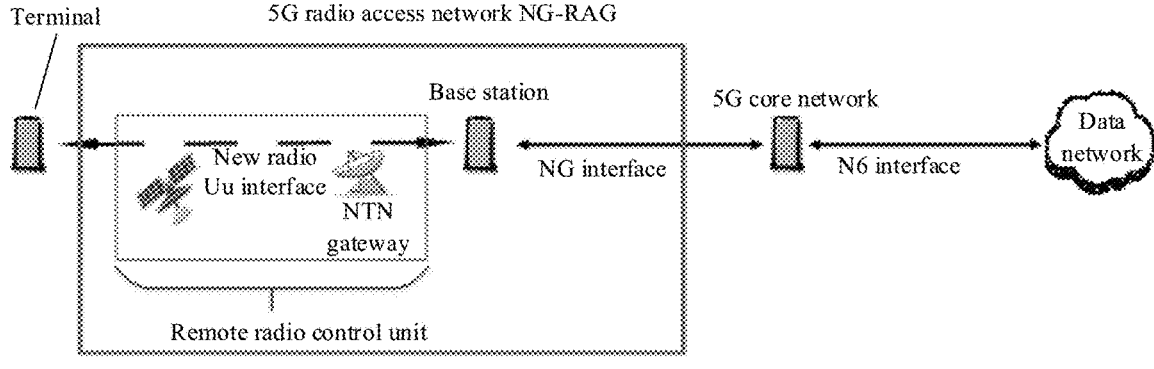
FIG. 1B is a schematic diagram of an NTN communication scenario according to an illustrative embodiment of the present disclosure.

The transparent transmission mode is as shown in FIG. 1B. An NTN ground station sends a base station signal to a satellite. The satellite converts the signal into a satellite frequency band and then sends it to a terminal through the satellite frequency band. The satellite does not perform demodulation on the base station signal except for frequency conversion and signal amplification.

Figure 1C:
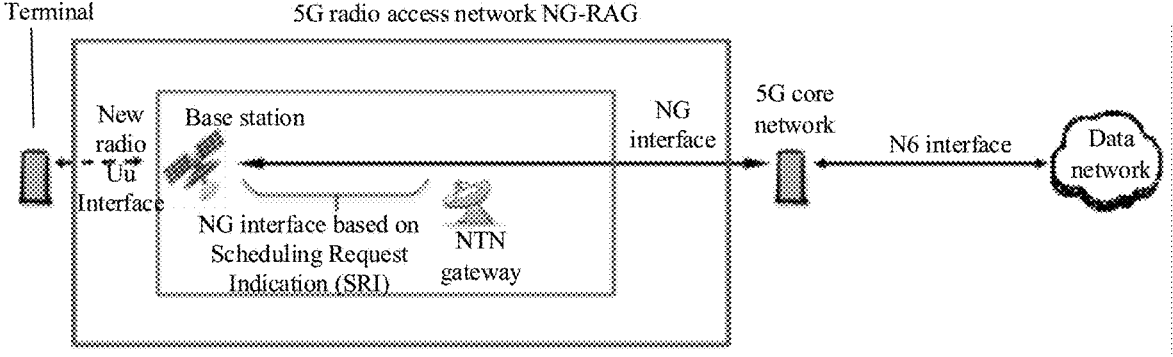
FIG. 1C is a schematic diagram of an NTN communication scenario according to an illustrative embodiment of the present disclosure.

The regeneration mode is as shown in FIG. 1C. After the NTN ground station sends the base station signal to the satellite, the satellite first demodulates and decodes the signal, then re-encodes and modulates it, and sends the regenerated signal through the satellite frequency band.

In the NTN network, in the case where the terminal and the base station communicate via the satellite, the maximum bidirectional delay between the terminal and the base station can be up to 541.46 milliseconds.

The RLC status report is used by the receiving end to inform the sending end which RLC SDUs were not successfully received. The reported range are Serial Numbers (SNs) corresponding to the RLC SDUs that were not successfully received by the terminal, within SNs between RX_Next and RX_Highest_Status. RX_Next is used to indicate the SN of the next RLC SDU that the receiving end expects to receive, and RX_Highest_Status refers to the largest SN of the RLC SDU that was not successfully received by the receiving end, which is to be indicated by the RLC status report.

There are two cases where the RLC status report is triggered. One is that it is triggered upon that a receiving end receives polling from a sending end, and the other is that it is triggered when the receiving end has a missing SDU and/or SDU segment. For the latter case, when the receiving end detects that there is the missing SDU or SDU segment, it starts a reassembly timer (t-reassembly), and a status report is triggered after expiry of the t-reassembly timer. After the status report is triggered, the terminal will generate the status report and then start a status prohibition timer (t-StatusProhibit). During the running of the t-StatusProhibit timer, the terminal will not generate any status report for a newly triggered status report. In addition, during the running of the t-reassembly after it is started, the receiving end will not trigger to start a new t-reassembly timer due to any new missing SDU and/or SDU segment, so it will not trigger a new status report, and the new missing SDU and/or SDU segment can trigger the t-reassembly only after the expiry of the t-reassembly, thereby triggering the status report.

In order to cope with the large RTT of the NTN network, the RLC status report can be generated for the cases where HARQ is enabled or disabled.

In the first case, HARQ is disabled.

The network device can use blind retransmission function. The network device can configure a t-reassembly timer with a shorter timing duration for the terminal, and configure a t-StatusProhibit timer with a longer timing duration for the terminal. In some examples, the timing duration of the t-reassembly can be tens of milliseconds. In some examples, the timing duration of the t-StatusProhibit can be larger than RTT. In this way, it can ensure that the receiving end responds quickly to the status report triggered by the new missing SDU and/or SDU segment, and can also ensure that the receiving end shall not re-send the status report before receiving the RLC SDU retransmitted by the sending end based on the received status report. However, accordingly, in this case, the t-StatusProhibit timer will prevent the terminal from sending the RLC status report triggered by the new missing SDU and/or SDU segment.

In the second case, HARQ is not disabled, that is, HARQ is enabled. The network device can configure a t-reassembly timer with a longer timing duration for the terminal. Usually the timing duration t of t-reassembly can be determined in the following formula:

$$T=\text{RTD}\times\text{nrof\_HARQ\_retrans}+\text{scheduling\_offset} \qquad \text{Formula 1}$$

where RTD is a delay value of RTT, nrof_HARQ_retrans is the number of HARQ retransmissions, which can be a non-negative integer, and scheduling_offset is a value of the scheduling offset.

In this way, it ensures that the terminal determines whether there is a missing SDU and/or SDU segment after receiving the HARQ retransmission. However, correspondingly, in this case, during the running of the t-reassembly timer, the new missing SDU and/or SDU segment cannot trigger the status report, resulting in that the network device cannot receive the status report of the new missing SDU and/or SDU segment in time.

In order to solve the above problems, the present disclosure provides the following solutions for generating a status report and setting a timer. The solutions of the present disclosure are explained below with respect to the cases where HARQ is enabled or disabled, respectively.

In the first case, HARQ is disabled, and the network-side device configures t-reassembly with a shorter timing duration for the terminal, but configures t-StatusProhibit with a longer timing duration for the terminal.

An embodiment of the present disclosure provides a method for generating a status report, which can be used for the terminal. Refer to FIG. 2, which is a flow chart of a method for generating a status report according to an embodiment. The method may include the following steps.

In step 201, it is determined that a reassembly timer expires and that a status prohibition timer is not started, a Radio Link Control (RLC) status report is generated and submitted to a Media Access Control (MAC) layer, and then the status prohibition timer is started.

In an embodiment of the present disclosure, in the case where the reassembly timer t-reassembly expires and the status prohibition timer t-StatusProhibit has not been started, the terminal can generate an RLC status report and submit it to a lower layer, where the lower layer specifically refers to a Media Access Control (MAC) layer. After receiving it, the MAC layer can promptly report it to the network device.

After submitting the generated RLC status report to the MAC layer, the terminal can start the t-StatusProhibit timer, and the timing duration of the t-StatusProhibit timer can be greater than the RTT.

In step 202, during running of the status prohibition timer, it is determined that a new RLC status report is triggered and a target condition for generating the new RLC status report is met, and the new RLC status report is generated and is submitted to the MAC layer.

In the related art, while the t-StatusProhibit timer is running, even if a new RLC status report is triggered, the generation of the new RLC status report will be prohibited because of the t-StatusProhibit timer.

Whereas in an embodiment of the present disclosure, during the running of the t-StatusProhibit timer, if it is determined that a new RLC status report is triggered and the target condition for generating the new RLC status report is met, the terminal may be allowed to promptly generate the new RLC status report and submit it to the MAC layer. Further, the terminal can submit the generated new RLC status report to the MAC layer.

In the above embodiment, even if the status prohibition timer is running, the new RLC status report may be generated in the case where the new RLC status report is triggered and the target condition for generating the new RLC status report is met. Therefore, in the case where there is a large RTT in the NTN network, it can be ensured that the terminal promptly generates the new RLC status report and submits it to the MAC layer, thereby ensuring that the terminal promptly reports the RLC status report to the network device, which improves the reliability of the NTN network communication.

In some optional embodiments, the terminal can restart the status prohibition timer after generating the new RLC status report and submitting it to the MAC layer. During the running of the status prohibition timer, the terminal is prohibited from sending any triggered new status report, which has high availability.

In some optional embodiments, the above target condition for generating the new RLC status report may include at least one of the following:

Condition 1: The triggered new RLC status report includes at least one of a missing target RLC Service Data Unit (SDU) and a missing target SDU segment.

The target RLC SDU is an RLC SDU not included in the RLC status report that has been submitted to the MAC layer last time, and the target SDU segment is a SDU segment not included in the RLC status report that has been submitted to the MAC layer last time.

That is, if the triggered new RLC status report includes at least one of the missing RLC SDU and SDU segment that was not included in the RLC status report submitted to the MAC layer last time, it is determined that the target condition for generating the new RLC status report is met.

In the embodiment of the present disclosure, the missing RLC SDU means that at least one missing byte segment of the RLC SDU is not received by the terminal.

The SN range interval of the RLC SDUs corresponding to the triggered new RLC status report may include RX_Highest_Status corresponding to the RLC status report that was submitted to the MAC layer last time, but does not include RX_Highest_Status corresponding to the triggered new RLC status report. RX_Highest_Status refers to the largest SN of the RLC SDU that was not successfully received by the terminal, which is to be indicated in the RLC status report.

Condition 2: The largest serial number SN of the RLC SDU that is not successfully received by the terminal correspondingly indicated by the triggered new RLC status report is different from the largest serial number SN of the RLC SDU that is not successfully received by the terminal correspondingly indicated by the RLC status report that has been submitted to the MAC layer last time.

That is, the RX_Highest_Status corresponding to the triggered new RLC status report is different from the RX_Highest_Status corresponding to the RLC status report submitted to the MAC layer last time.

Condition 3: The SN of the next RLC SDU to be received by the terminal correspondingly indicated by the triggered new RLC status report is different from the SN of the next RLC SDU to be received by the terminal correspondingly indicated by the RLC status report that has been submitted to the MAC layer last time.

That is, the RX_Next corresponding to the triggered new RLC status report is different from the RX_Next corresponding to the RLC status report submitted to the MAC layer last time. RX_Next is used to indicate the SN of the next RLC SDU to be received by the terminal.

Condition 4: The largest serial number SN of the RLC SDU that is not successfully received by the terminal correspondingly indicated by the triggered new RLC status report is different from the largest serial number SN of the RLC SDU that is not successfully received by the terminal correspondingly indicated by the RLC status report that has been submitted to the MAC layer last time, and/or, the serial number SN of the next RLC SDU to be received by the terminal correspondingly indicated by the triggered new RLC status report is different from the serial number SN of the next RLC SDU to be received by the terminal correspondingly indicated by the RLC status report that has been submitted to the MAC layer last time.

That is, the RX_Highest_Status corresponding to the triggered new RLC status report is different from the RX_Highest_Status corresponding to the RLC status report submitted to the MAC layer last time, and/or, the RX_Next corresponding to the triggered new RLC status report is different from the RX_Next corresponding to the RLC status report submitted to the MAC layer last time.

In the above embodiment, when the terminal determines that at least one of the above conditions is met, it determines that the target condition for generating the new RLC status report is met, and the terminal can promptly generate the new RLC status report so that the terminal can promptly submit it to the MAC layer and the MAC layer promptly submits it to the network device, which improves the reliability of NTN network communication.

For example, if the network device configures the t-reassembly with a shorter timing duration for the terminal, but configures the t-StatusProhibit with a longer timing duration for the terminal, the terminal is triggered to start the t-reassembly based on the missing RLC SDU, and after the expiry of the t-reassembly, if the t-StatusProhibit is not started, the terminal can generate a status report and submit it to the lower layer. Specifically, the terminal can submit it to the MAC layer. The terminal can start the t-StatusProhibit at this time. During the running of the t-StatusProhibit, if a new RLC status report is triggered and the triggered status report includes a missing RLC SDU that was not included in the last RLC status report submitted to the MAC layer (that is, if condition 1 of the above target conditions is met), the terminal can generate the new RLC status report and submit it to the MAC layer, and restart the t-StatusProhibit.

In some optional embodiments, as shown in FIG. 3, which is a flow chart of a method for generating a status report according to an embodiment, the method may include the following steps.

In step 301, it is determined that a reassembly timer expires and that a status prohibition timer is not started, a Radio Link Control (RLC) status report is generated and submitted to a Media Access Control (MAC) layer, and then the status prohibition timer is started.

In step 302, during running of the status prohibition timer, it is determined that a new RLC status report is triggered and at least one of the target conditions is not met, the new RLC status report is generated and submitted to the MAC layer after expiry of the status prohibition timer, and then the status prohibition timer is restarted.

In the above embodiment, if a new RLC status report is triggered during the running of the t-StatusProhibit, but at least one of the above target conditions is not met, the terminal can generate the new RLC status report after the expiry of the t-StatusProhibit, and submit it to the MAC layer, and then restart the t-StatusProhibit. It can also ensure that the terminal promptly generates the new RLC status report, which has high availability.

In some optional embodiments, before performing the above step 202 or step 302, the terminal may predetermine that a first enabling switch configured for the terminal by the network device is in an on state.

In some examples, the first enabling switch includes at least one of the following:

the status report during running of a Select Retransmission (SR) prohibition timer is allowed;

the status prohibition timer corresponding to a first duration is configured, wherein the first duration is larger and may be greater than the round trip time (RTT);

the status prohibition timer corresponding to the first duration and a reassembly timer corresponding to a second duration are configured, wherein the second duration is small and may be smaller than a first preset value;

NTN is configured;

NTN corresponding to a RTT of a third duration is configured, wherein the third duration is large and may be larger than a second preset value; and Hybrid Automatic Repeat Request HARQ is disabled.

The second duration may be tens of milliseconds, and the specific value is not limited in the present disclosure.

In the above embodiment, when the terminal predetermines that at least one of the above first enabling switches configured by the network device for the terminal is in the on state, even if the status prohibition timer is running, the terminal can generate a new RLC status report in the case where the new RLC status report is triggered and the target condition for generating the new RLC status report is met. Therefore, in the case where there is a large RTT in the NTN network, it can be ensured that the terminal promptly generates the new RLC status report and submits it to the MAC layer, thereby ensuring that the terminal promptly reports the RLC status report to the network device, which improves the reliability of the NTN network communication.

In the second case, HARQ is not disabled, and the network device configures a t-reassembly with a larger timing duration for the terminal. This case is mainly aimed at Acknowledged Mode (AMD).

An embodiment of the present disclosure provides a method for generating a status report, which can be used for the terminal. Refer to FIG. 4, which is a flow chart of a method for generating a status report according to an embodiment. The method may include the following steps.

In step 401, after expiry of a target reassembly timer, a Radio Link Control (RLC) status report is generated and submitted to a Media Access Control (MAC) layer, wherein the target reassembly timer is any one of one or more reassembly timers that have been started.

In an embodiment of the present disclosure, parallel t-reassembly timers may be allowed, or multiple t-reassembly timers may be allowed. When any t-reassembly timer in one or more parallel t-reassembly timers expires, that is, when the target reassembly timer expires, the terminal can generate the RLC status report and submit it to the lower layer, specifically, it can be submitted to the MAC layer.

In the above embodiment, the parallel reassembly timers are allowed, and in the case where the target reassembly timer expires, the RLC status report is generated and submitted to the MAC layer in a timely manner. In the case where there is a large RTT in the NTN network, the purpose of ensuring that the terminal promptly generates the new RLC status report and submits it to the MAC layer is achieved, thereby ensuring that the terminal promptly reports the RLC status report to the network device, improving the reliability of the NTN network communications.

In some optional embodiments, as shown in FIG. 5, which is a flow chart of a method for generating a status report according to an embodiment, the method may include the following steps.

In step 501, after expiry of a target reassembly timer, a target Serial Number (SN) associated with the target reassembly timer is determined.

In an embodiment of the present disclosure, the target SN is RX_Highest_Status, which is the largest SN of the RLC Service Data Unit (SDU) that is not successfully received by the terminal, which needs to be reported in the RLC status report.

In a possible implementation, RX_Highest_Status is greater than or equal to the SN of the first RLC SDU for which not all bytes have been received, as indicated by a trigger RX_Next_Status_Trigger associated with the target reassembly timer, that is, the first SN that has a missing RLC SDU and/or SDU segment.

RX_Next_Status_Trigger is also a type of timer. Each reassembly timer corresponds to and is associated with at least one RX_Next_Status_Trigger. The SN indicated by the RX_Next_Status_Trigger is RX_Next_Highest. RX_Next_Highest is the largest SN of the next RLC SDU to be received by the terminal at the time when RX_Next_Status_Trigger triggers the associated reassembly timer to be started.

In step 502, a Radio Link Control (RLC) status report is generated and submitted to a Media Access Control (MAC) layer.

In an embodiment of the present disclosure, after the target reassembly timer expires, the RLC status report is generated. The SN range of the generated RLC status report is (RX_Next, RX_Highest_Status), where RX_Next is the SN of the next RLC SDU to be received by the terminal at the time when the target reassembly timer is triggered to start, and RX_Highest_Status is the target SN described above.

In the above embodiment, after the target reassembly timer expires, the terminal can determine the target SN associated with the target reassembly timer, and generate a corresponding RLC status report based on the target SN, thereby achieving the purpose of generating the RLC status report in a timely manner, which has high availability.

In some optional embodiments, after the target reassembly timer expires, the trigger RX_Next_Status_Trigger associated with the target reassembly timer is not updated.

In the related art, since the number of the reassembly timers is one, the corresponding RX_Next_Status_Trigger needs to be continuously updated. However, in an embodiment of the present disclosure, since parallel reassembly timers are allowed, after any reassembly timer expires, the corresponding RX_Next_Status_Trigger may not be updated.

In the above embodiment, after the target reassembly timer expires, the associated trigger may be not updated, which has high availability.

In some optional embodiments, as shown in FIG. 6, which is a flow chart of a method for generating a status report according to an embodiment, the method may include the following steps.

In step 601, during running of a target reassembly timer, it is determined that there is no missing RLC SDU and/or SDU segment in RLC SDUs corresponding to a target SN range, and the target reassembly timer is stopped.

The target SN range is a SN range from a first SN to a second SN. The first SN is RX_Next, which is the SN of the next RLC SDU to be received by the terminal. The second SN is the SN indicated by the trigger associated with the target reassembly timer.

In an embodiment of the present disclosure, during the running of the target reassembly timer, if there is no missing RLC SDU and/or SDU segment in the RLC SDUs within the target SN range from RX_Next to the SN indicated by RX_Next_Status_Trigger associated with the target timer, the target reassembly timer can be stopped.

In the above embodiment, during the running of the target reassembly timer, in the case where there is no missing RLC SDU and/or SDU segment in the RLC SDUs within the target SN range from RX_Next to the SN indicated by the RX_Next_Status_Trigger associated with the target timer, the target reassembly timer is stopped to avoid that the RLC status report is generated after the expiry of the target reassembly timer, which has high availability.

In a possible implementation, while stopping the target reassembly timer, a trigger prohibition timer can also be restarted. The trigger prohibition timer is used to prohibit triggering to start a new reassembly timer during the running of the trigger prohibition timer.

In some examples, the trigger prohibition timer may be a status prohibition timer, or the trigger prohibition timer may be a dedicated timer that prohibits triggering to start a new reassembly timer during the running, which is not limited in the present disclosure.

In the above embodiment, by starting the trigger prohibition timer while stopping the target reassembly timer, the waste of resources caused by the terminal frequently triggering to start new reassembly timers is avoided, which has high availability.

In some optional embodiments, as shown in FIG. 7, which is a flow chart of a method for generating a status report according to an embodiment, the method may include the following steps.

In step 701, during running of a target reassembly timer, a RLC SDU corresponding to a SN indicated by a trigger associated with the target reassembly timer is not within a reception window, and the SN indicated by the trigger associated with the target reassembly timer is different from a third SN, the target reassembly timer is stopped.

In an embodiment of the present disclosure, the third SN can be determined in the following formula:

$$\text{Third SN} = \text{RX\_Next} + \text{AM\_Window\_Size} \quad \text{Formula 2}$$

RX_Next is the SN of the next RLC SDU to be received by the terminal, and AM_Window_Size is the number of SNs of SDUs included in the reception window for receiving AM mode PDUs.

That is, during the running of the target reassembly timer, if the RLC SDU corresponding to the SN indicated by the RX_Next_Status_Trigger associated with the target reassembly timer is not within the above reception window, and the SN indicated by the RX_Next_Status_Trigger is different from the above third SN, the target reassembly timer can also be stopped to avoid waste of resources.

In a possible implementation, while stopping the target reassembly timer, a trigger prohibition timer can also be restarted. The trigger prohibition timer is used to prohibit triggering to start a new reassembly timer during the running of the trigger prohibition timer.

In some examples, the trigger prohibition timer may be a status prohibition timer, or the trigger prohibition timer may be a dedicated timer that prohibits triggering to start a new reassembly timer during the running, which is not limited in the present disclosure.

In the above embodiment, by starting the trigger prohibition timer while stopping the target reassembly timer, the waste of resources caused by the terminal frequently triggering to start new reassembly timers is avoided, which has high availability.

In some optional embodiments, as shown in FIG. 8, which is a flow chart of a method for generating a status report according to an embodiment, the method may include the following steps.

In step 801, it is determined that there is a missing RLC SDU and/or SDU segment in a received acknowledgment mode (AMD) Packet Data Unit (PDU), and a reassembly timer is triggered to start.

In an embodiment of the present disclosure, when the terminal receives an AMD Packet Data Unit (PDU), if there is a missing RLC SDU and/or SDU segment, the terminal can trigger to start a t-Reassembly.

In step 802, during running of at least one reassembly timer that has been started, it is determined that there is a missing RLC SDU and/or SDU segment in a newly received AMD PDU, a parallel new reassembly timer is triggered to be started.

In an embodiment of the present disclosure, during the running of at least one started t-reassembly, if it is determined that there is the missing RLC SDU and/or SDU segment in the newly received AMD PDUs, the terminal may trigger to start a new t-reassembly in parallel.

In step 803, after expiry of a target reassembly timer, a Radio Link Control (RLC) status report is generated and submitted to a Media Access Control (MAC) layer, wherein the target reassembly timer is any one of one or more reassembly timers that have been started.

In the above embodiment, parallel reassembly timers can be allowed, and in the case where any of the reassembly timers expires, the RLC status report is generated and submitted to the MAC layer, which ensures that the terminal promptly generates the new RLC status report and submits it to the MAC layer in the case where there is a large RTT in the NTN network, thereby ensuring that the terminal can promptly report the RLC status report to the network device, improving the reliability of the NTN network communication.

In some optional embodiments, when triggering to start any reassembly timer, the terminal may also determine the SN indicated by the RX_Next_Status_Trigger associated with the t-reassembly that is triggered to start.

In a possible implementation, the SN indicated by the RX_Next_Status_Trigger associated with the t-reassembly that is triggered to start may be RX_Next_Highest, where RX_Next_Highest may be the largest SN of the next RLC SDU to be received by the terminal.

That is, when the terminal receives an AMD PDU, it determines that there is the missing RLC SDU and/or SDU segment, the terminal triggers to start a t-reassembly, and determines that the SN indicated by the RX_Next_Status_Trigger associated with the t-reassembly is RX_Next_Highest. During the running of the t-reassembly, when receiving a new AMD PDU and determining that there is the missing RLC SDU and/or SDU segment, the terminal can trigger to start another t-reassembly, and determine that the SN indicated by the RX_Next_Status_Trigger associated with the t-reassembly is RX_Next_Highest. It should be noted that the above two RX_Next_Highest are different.

In some optional embodiments, as shown in FIG. 9, which is a flow chart of a method for generating a status report according to an embodiment, the method may include the following steps.

In step 901, it is determined that there is a missing RLC SDU and/or SDU segment in a received acknowledgment mode (AMD) Packet Data Unit (PDU), and a reassembly timer is triggered to start.

In step 902, during running of at least one reassembly timer that has been started, it is determined that there is a missing RLC SDU and/or SDU segment in a newly received AMD PDU, and a parallel new reassembly timer is triggered to start.

In step 903, after any of the reassembly timers is started, a trigger prohibition timer is started.

In an embodiment of the present disclosure, the trigger prohibition timer is used to prohibit triggering to start a new reassembly timer during running of the trigger prohibition timer. In some examples, the trigger prohibition timer may include any of the following: a status prohibition timer, and a dedicated timer used to prohibit triggering to start a new reassembly timer during the running.

In step 904, after expiry of the trigger prohibition timer, a new reassembly timer is allowed to be triggered to start.

In an embodiment of the present disclosure, every time the terminal triggers a t-reassembly, a trigger prohibition timer can be started. During the running of the trigger prohibition timer, it cannot trigger to start a new t-reassembly so as to avoid waste of resources caused by frequently starting t-reassembly on the terminal side. After expiry of the trigger prohibition timer, no matter how many t-reassembly timers are currently running, such as 0, 1 or more, the terminal can be allowed to trigger a new t-reassembly again.

In step 905, after expiry of a target reassembly timer, a Radio Link Control (RLC) status report is generated and submitted to a Media Access Control (MAC) layer.

The target reassembly timer is any one of one or more reassembly timers that have been started.

In the above embodiment, after any reassembly timer is triggered, the trigger prohibition timer can be started to avoid waste of resources caused by frequently starting parallel reassembly timers by the terminal, which has high availability.

In some optional embodiments, the terminal needs to determine in advance that a second enabling switch configured by the network device for the terminal is in an on state before generating the Radio Link Control (RLC) status report and submitting it to the Media Access Control (MAC) layer after the target reassembly timer expires.

In some examples, the second enabling switch includes at least one of the following:

parallel reassembly timers are allowed or multiple reassembly timers are allowed;

a reassembly timer corresponding to a fourth duration is configured, the fourth duration is determined based on the RTT, the number of HARQ retransmissions, and a scheduling offset, and in some examples, the fourth duration can be determined according to the above formula 1;

the reassembly timer corresponding to the fourth duration and a status prohibition timer corresponding to a fifth duration are configured, and the fifth duration is small and may be smaller than a third preset value;

NTN is configured;

NTN corresponding to a RTT of a third duration is configured, and the third duration is large and may be larger than a second preset value;

Hybrid Automatic Repeat reQuest (HARQ) is enabled.

That the parallel reassembly timers are allowed or the multiple reassembly timers are allowed can also be replaced by that a reassembly timer per a missing RLC SDU is allowed.

In the above embodiment, the parallel reassembly timers are allowed in the case where the terminal determines in advance that at least one of the above second enabling switches configured by the network device for the terminal is in an on state, and in the case where the target reassembly timer expires, the RLC status report is generated and submitted to the MAC layer in a timely manner. When there is a large RTT in the NTN network, the purpose of ensuring that the terminal promptly generates the new RLC status report and submits it to the MAC layer is achieved, thereby ensuring that the terminal promptly reports the RLC status report to the network device, improving the reliability of the NTN network communication.

In the third case, HARQ is not disabled, and the network-side device configures a t-reassembly with a larger timing duration for the terminal. This case is mainly aimed at Unacknowledged Mode Data (UMD). Since this case is for the UMD mode, it is irrelevant to the status report. The present disclosure provides the following solution for setting a timer.

In an embodiment of the present disclosure, due to the serially starting of t-reassembly timers, a longer t-reassembly in the UM mode will lead to a longer reassembly time of the RLC SDUs by the terminal.

An embodiment of the present disclosure provides a method for setting a timer, which can be used for the terminal. Refer to FIG. 10, which is a flow chart of a method for setting a timer according to an embodiment. The method may include the following steps.

In step 1001, it is determined that there is a missing Radio Link Control (RLC) Service Data Unit (SDU) and/or SDU segment in a received UM Packet Data Unit (PDU), and a reassembly timer is triggered to start.

In an embodiment of the present disclosure, when the terminal receives a UM PDU, if it is determined that there is a missing Radio Link Control (RLC) Service Data Unit (SDU) and/or SDU segment, the terminal can trigger to start a t-reassembly.

In step 1002, during running of at least one reassembly timers that have been started, it is determined that there is a missing RLC SDU and/or SDU segment in a newly received UM PDU, and a parallel new reassembly timer is triggered to start.

In an embodiment of the present disclosure, during running of the at least one started t-reassembly, the terminal determines that there is the missing RLC SDU and/or SDU segment in the newly received UM PDU, and triggers to start a new t-reassembly in parallel.

In the above embodiment, parallel reassembly timers are allowed, and for the UM mode in the NTN network, the terminal can be enabled to promptly start the reassembly timer so as to reassemble the SDUs, which has high availability.

In some optional embodiments, each time a t-reassembly is triggered to start, the terminal can determine that the SN indicated by the RX_Next_Status_Trigger associated with the t-reassembly may be RX_Next_Highest, where RX_Next_Highest may be the largest SN of the next RLC SDU to be received by the terminal at the time when the t-reassembly is triggered to start.

That is, when the terminal receives a UMD PDU, the terminal determines that there is the missing RLC SDU and/or SDU segment, triggers to start a t-reassembly, and determines that the SN indicated by the RX_Next_Status_Trigger associated with the t-reassembly is RX_Next_Highest. During the running of the t-reassembly, when receiving a new UMD PDU and determining that there is the missing RLC SDU and/or SDU segment, the terminal can trigger to start another t-reassembly, and determine that the SN indicated by the RX_Next_Status_Trigger associated with the t-reassembly is RX_Next_Highest. It should be noted that the above two RX_Next_Highest are different.

In some optional embodiments, as shown in FIG. 11, which is a flow chart of a method for setting a timer according to an embodiment, the method may include the following steps.

In step 1101, it is determined that there is a missing Radio Link Control (RLC) Service Data Unit (SDU) and/or SDU segment in a received UM Packet Data Unit (PDU), and a reassembly timer is triggered to start.

In step 1102, during running of at least one reassembly timer that has been started, it is determined that there is a missing RLC SDU and/or SDU segment in a newly received UM PDU, and a parallel new reassembly timer is triggered to start.

In step 1103, after a target reassembly timer expires, a target SN associated with the target reassembly timer is determined.

The target reassembly timer is any one of the at least one reassembly timer that has been started, and the target SN is the largest SN of the RLC Service Data Unit (SDU) that is not successfully received by the terminal.

The target SN is RX_Next_Highest. After the target reassembly timer expires, the terminal can determine that the RX_Next_Highest associated with the target reassembly timer may be greater than or equal to the SN of the first RLC SDU for which not all bytes are received as indicated by the RX_Next_Status_Trigger associated with the target reassembly timer, that is, the first SN that has the missing RLC SDU and/or SDU segment.

In the above embodiment, after the target reassembly timer expires, the terminal can determine the target SN associated with the target reassembly timer, which facilitates the terminal to promptly perform SDU reassembly and has high availability.

In the above embodiment, after the target reassembly timer expires, the RX_Next_Status_Trigger associated with the target reassembly timer is not updated.

In the above embodiment, after the target reassembly timer expires, the associated trigger may be not updated, which has high availability.

In some optional embodiments, as shown in FIG. 12, which is a flow chart of a method for setting a timer according to an embodiment, the method may include the following steps.

In step 1201, it is determined that there is a missing Radio Link Control (RLC) Service Data Unit (SDU) and/or SDU segment in a received UM Packet Data Unit (PDU), and a reassembly timer is triggered to start.

In step 1202, during running of at least one reassembly timer that has been started, it is determined that there is a missing RLC SDU and/or SDU segment in a newly received UM PDU, and a parallel new reassembly timer is triggered to start.

In step 1203, during running of a target reassembly timer, it is determined that there is no missing RLC SDU and/or SDU segment in RLC SDUs corresponding to a target SN range, and the target reassembly timer is stopped.

The target SN range is a SN range from a first SN to a second SN. The first SN is RX_Next, which is a SN of the next RLC SDU to be received by the terminal. The second SN is a SN indicated by the trigger associated with the target reassembly timer.

That is, during the running of the target reassembly timer, if there is no missing RLC SDU and/or SDU segment in the RLC SDUs within the target SN range from Rx_NEXT to the SN indicated by the RX_Next_Status_Trigger associated with the target reassembly timer, the terminal can stop the target reassembly timer.

In the above embodiment, during the running of the target reassembly timer, in the case where there is no missing RLC SDU and/or SDU segment in the RLC SDUs within the target SN range from RX_Next to the SN indicated by RX_Next_Status_Trigger associated with the target timer, the target reassembly timer is stopped to avoid waste of resources, which has high availability.

In some optional embodiments, as shown in FIG. 13, which is a flow chart of a method for setting a timer according to an embodiment, the method may include the following steps.

In step 1301, it is determined that there is a missing Radio Link Control (RLC) Service Data Unit (SDU) and/or SDU segment in a received UM Packet Data Unit (PDU), and a reassembly timer is triggered to start.

In step 1302, during running of at least one reassembly timer that has been started, it is determined that there is a missing RLC SDU and/or SDU segment in a newly received UM PDU, and a parallel new reassembly timer is triggered to start.

In step 1303, during running of the target reassembly timer, a RLC SDU corresponding to a SN indicated by a trigger associated with the target reassembly timer is not within a reception window, and the SN indicated by the trigger associated with the target reassembly timer is different from a third SN, the target reassembly timer is stopped.

The third SN is a sum of the SN of the next RLC SDU to be received by the terminal and the number of SNs corresponding to the SDUs included in the reception window.

In the above embodiment, during the running of the target reassembly timer, if the RLC SDU corresponding to the SN indicated by the RX_Next_Status_Trigger associated with the target reassembly timer is not within the above reception window, and the SN indicated by the RX_Next_Status_Trigger is different from the above third SN, the target reassembly timer can also be stopped to avoid waste of resources.

In some optional embodiments, in the case of the UM mode and HARQ is not disabled, before setting the timer, the terminal may determine in advance that a second enabling switch configured for the terminal by the network device is in the on state.

The second enabling switch includes at least one of the following:

parallel reassembly timers are allowed or multiple reassembly timers are allowed;

a reassembly timer corresponding to a fourth duration is configured, and the fourth duration is determined based on the RTT, the number of HARQ retransmissions, and the scheduling offset;

the reassembly timer corresponding to the fourth duration and a status prohibition timer corresponding to a fifth duration are configured, and the fifth duration is small and may be smaller than a third preset value;

Non-terrestrial communication NTN is configured;

NTN corresponding to a RTT of a third duration is configured, and the third duration is large and may be larger than a second preset value; and Hybrid Automatic Repeat reQuest (HARQ) is enabled.

In the above embodiment, the parallel reassembly timers are allowed in the case where the terminal determines in advance that at least one of the above second enabling switches configured by the network device for the terminal is in the on state, which ensures that the terminal promptly performs SDU reassembly in the UM mode.

In an embodiment of the present disclosure, the above solution for setting the timer can also be applied to the second case mentioned above, that is, the case where HARQ is not disabled, and the network device configures a t-reassembly with a larger timing duration for the terminal. This case is mainly aimed at the AM mode. In the AM mode, the specific solution for setting the timer is the same as the solution for setting the timer in the UM mode, which will not be repeated here.

An embodiment of the present disclosure provides an information configuration method that can be used for a network device. Refer to FIG. 14. FIG. 14 is a flow chart of an information configuration method according to an embodiment. The method may include the following steps.

In step 1401, at least timing duration information of a reassembly timer is configured for a terminal.

In the above embodiment, the network device can configure at least the timing duration information of the reassembly timer for the terminal, so that the terminal can generate a status report or set the timer duration, which is simple to implement and has high availability.

In a possible implementation, when it is determined that Hybrid Automatic Repeat reQuest (HARQ) is disabled, the network device may configure a status prohibition timer for the terminal to have a timing duration of a first duration, and configure a reassembly timer for the terminal to have a timing duration of a second duration.

The first duration may be long and may be greater than the round trip time (RTT). The second duration may be small and may be smaller than a first preset value. In some examples, the second duration may be tens of milliseconds.

In the above embodiment, in the case where HARQ is disabled in the NTN communication, the network device can configure the status prohibition timer with a longer timing duration for the terminal, and configure the reassembly timer with a smaller duration for the terminal, thereby ensuring that the terminal can quickly respond to the status report triggered by the new missing RLC SDU and/or new SDU segment, and can also ensure that the terminal will not repeatedly send the RLC status reports before receiving the retransmitted RLC SDU sent by the network device.

In some optional embodiments, in the case where HARQ is disabled, the network device can also configure state information of a first enabling switch for the terminal, where the state information can indicate whether the first enabling switch is in an on state or an off state. In some examples, the first enabling switch includes at least one of the following: a status report during running of a select retransmission (SR) prohibition timer is allowed; the status prohibition timer corresponding to the first duration has been configured; the status prohibition timer corresponding to the first duration and the reassembly timer corresponding to the second duration have been configured; non-terrestrial communication NTN has been configured; NTN corresponding to a RTT of a third duration has been configured, and the third duration is greater than a second preset value; and Hybrid Automatic Repeat reQuest (HARQ) is disabled.

In the above embodiment, the network device can configure the state information of the first enabling switch for the terminal, so that after determining that the first enabling switch is in the on state, during the running of the status prohibition timer, the terminal can determine a new RLC status report is triggered and the target condition for generating the new RLC status report is met, and generate the new RLC status report and submit it to the MAC layer, which achieves the purpose of ensuring that the terminal promptly generates the new RLC status report and submits it to the MAC layer when there is a large RTT in the NTN network, and ensures that the terminal promptly reports the RLC status report to the network device i, improving the reliability of the NTN network communication.

In another possible implementation, in the case where it is determined that Hybrid Automatic Repeat reQuest (HARQ) is not disabled, that is, HARQ is enabled, the network device may configure the reassembly timer with the timing duration of a fourth duration for the terminal.

The fourth duration is determined based on the RTT, the number of HARQ retransmissions, and the scheduling offset. Specifically, the fourth duration can be determined according to the above formula 1.

In the above embodiment, when HARQ is not disabled in the NTN communication, the network device can configure the reassembly timer with a longer duration for the terminal, thereby ensuring that the terminal determines whether there is a missing RLC SDU and/or SDU segment after receiving the HARQ retransmission, which has high availability. In some optional embodiments, in the case where HARQ is not disabled, the network device can also configure state information of a second enabling switch for the terminal, where the state information can indicate that the second enabling switch is in an on state or off state. In some examples, the second enabling switch includes at least one of the following: parallel reassembly timers are allowed or multiple reassembly timers are allowed; a reassembly timer corresponding to the fourth duration has been configured; the reassembly timer corresponding to the fourth duration and a status prohibition timer corresponding to a fifth duration have been configured, the fifth duration is smaller than a third preset value; non-terrestrial communication NTN has been configured; NTN corresponding to a RTT of a third duration has been configured, and the third duration is greater than a second preset value; and Hybrid Automatic Repeat reQuest (HARQ) is enabled.

In the above embodiment, the network device can configure the state information of the second enabling switch for the terminal, so that after the terminal determines that the second enabling switch is in the on state, it can generate a Radio Link Control (RLC) status report and submit it to the Media Access Control (MAC) layer after the expiry of the target reassembly timer, which achieves the purpose of ensuring that the terminal promptly generates the new RLC status report and submits it to the MAC layer when there is a large RTT in the NTN network, and ensures that the terminal promptly reports the RLC status report to the network device, improving the reliability of the NTN network communication.

Corresponding to the foregoing method embodiments, the present disclosure also provides device embodiments.

Referring to FIG. 15, FIG. 15 is a block diagram of an apparatus for generating a status report according to an illustrative embodiment. The apparatus is used for a terminal and includes:

a first generating module 1501, configured to determine that a reassembly timer expires and that a status prohibition timer is not started, generate a Radio Link Control (RLC) status report, submit the RLC status report to a Media Access Control (MAC) layer, and then start the status prohibition timer; and a second generating module 1502, configured to determine that a new RLC status report is triggered and a target condition for generating the new RLC status report is met, generate the new RLC status report, and submit the new RLC status report to the MAC layer, during running of the status prohibition timer.

Referring to FIG. 16, FIG. 16 is a block diagram of an apparatus for generating a status report according to an illustrative embodiment. The apparatus is used for a terminal and includes:

a third generating module 1601, configured to generate a Radio Link Control (RLC) status report and submit the RLC status report to a Media Access Control (MAC) layer after a target reassembly timer expires, wherein the target reassembly timer is any one of one or more reassembly timers that have been started.

Referring to FIG. 17, FIG. 17 illustrates an apparatus for setting a timer according to an illustrative embodiment. The apparatus is used for a terminal and includes:

a first starting module 1701, configured to determine that there is a missing Radio Link Control (RLC) Service Data Unit (SDU) and/or SDU segment in a received Packet Data Unit (PDU) in a target mode, and trigger to start a reassembly timer; and a second starting module 1702, configured to determine that there is a missing RLC SDU and/or SDU segment in a newly received PDU in the target mode, and trigger to start a new reassembly timer in parallel, during running of at least one reassembly timer that has been started.

Referring to FIG. 18, FIG. 18 illustrates an information configuration apparatus according to an illustrative embodiment. The apparatus is used for a network device and includes:

a duration information configuring module 1801, configured to configure at least timing duration information of a reassembly timer for a terminal.

For the apparatus embodiments, since they substantially correspond to the method embodiments, reference can be made to related part of the description of the embodiments of the methods. The apparatus embodiments described above are merely illustrative, where the units described as separate components may be or may not be physically separated, and the components displayed as units may be or may not be physical units, i.e., they can be located in one place, or they can be distributed on multiple network units. Some or all of the modules may be selected according to actual needs to achieve the objectives of the technical solutions of the present disclosure.

Correspondingly, the present disclosure also provides an apparatus for generating a status report, including:

a processor; and a memory configured to store instructions executable by the processor, wherein the processor is configured to perform any of the above-mentioned methods for generating a status report.

Correspondingly, the present disclosure also provides an apparatus for setting a timer, including:

a processor; and a memory configured to store instructions executable by the processor, wherein the processor is configured to perform any of the above methods for setting a timer.

FIG. 19 is a block diagram of an electronic device 1900 according to an illustrative embodiment. For example, the electronic device 1900 may be a mobile phone, a tablet computer, an e-book reader, a multimedia playback device, a wearable device, a vehicle-mounted terminal, an iPad, a smart TV and other terminals.

Referring to FIG. 19, the electronic device 1900 may include one or more of the following components: a processing component 1902, a memory 1904, a power supply component 1906, a multimedia component 1908, an audio component 1910, an input/output (I/O) interface 1912, a sensor component 1916, and a communication component 1918.

The processing component 1902 generally controls the overall operations of electronic device 1900, such as operations associated with display, phone calls, data communications, camera operations, and recording operations. The processing component 1902 may include one or more processors 1920 to execute instructions to complete all or part of the steps of the methods for generating a status report or setting a timer. Additionally, the processing component 1902 may include one or more modules that facilitate interaction between the processing component 1902 and other components. For example, the processing component 1902 may include a multimedia module to facilitate interaction between the multimedia component 1908 and the processing component 1902. For another example, the processing component 1902 can read executable instructions from the memory to implement the steps for generating a status report or setting a timer provided in the above embodiments.

The memory 1904 is configured to store various types of data to support operations on the electronic device 1900. Examples of the data include instructions for any application or method operating on the electronic device 1900, contact data, phone book data, messages, pictures, videos, etc. The memory 1904 can be implemented in any type of volatile or non-volatile storage device, such as a static random access memory (SRAM), an electrically erasable programmable read-only memory (EEPROM), an erasable Programmable read-only memory (EPROM), a programmable read-only memory (PROM), a read-only memory (ROM), a magnetic memory, a flash memory, a magnetic disk and an optical disk, or a combination thereof.

The power supply component 1906 provides power to various components of the electronic device 1900. The power supply component 1906 may include a power management system, one or more power supplies, and other components associated with generating, managing, and distributing power for the electronic device 1900.

The multimedia component 1908 includes a display screen that provides an output interface between the electronic device 1900 and the user. In some embodiments, the multimedia component 1908 includes a front-facing camera and/or a rear-facing camera. When the electronic device 1900 is in an operating mode, such as a shooting mode or a video mode, the front-facing camera and/or the rear-facing camera may receive external multimedia data. Each of the front-facing camera and the rear-facing camera can be a fixed optical lens system or have a focal length and optical zoom capabilities.

The audio component 1910 is configured to output and/or input audio signals. For example, the audio component 1910 includes a microphone (MIC). When the electronic device 1900 is in an operation mode, such as a call mode, a recording mode or a voice recognition mode, the microphone is configured to receive external audio signals. The received audio signals may be further stored in the memory 1904 or sent via the communication component 1918. In some embodiments, the audio component 1910 further includes a speaker for outputting the audio signals.

The I/O interface 1912 provides an interface between the processing component 1902 and a peripheral interface module. The peripheral interface module may be a keyboard, a click wheel, a button, or the like. The button may include but is not limited to a home button, a volume button, a start button, and a lock button.

The sensor component 1916 includes one or more sensors for providing various state evaluations of the electronic device 1900. For example, the sensor component 1916 can detect an open/closed state of the electronic device 1900 and relative positioning of a component such as a display or a keypad of the electronic device 1900. The sensor component 1916 can also detect a position change of the electronic device 1900 or a component of the electronic device 1900, presence or absence of contact with the electronic device 1900 by the user, orientation or acceleration/deceleration of the electronic device 1900, and temperature changes of the electronic device 1900. The sensor component 1916 may include a proximity sensor configured to detect presence of a nearby object without any physical contact. The sensor component 1916 may also include an optical sensor, such as a CMOS or CCD image sensor, for use in imaging applications. In some embodiments, the sensor component 1916 may also include an acceleration sensor, a gyroscope sensor, a magnetic sensor, a pressure sensor or a temperature sensor.

The communication component 1918 is configured to facilitate wired or wireless communication between the electronic device 1900 and other devices. The electronic device 1900 can access a wireless network based on a communication standard, such as Wi-Fi, 2G, 3G, 4G, 5G or 6G, or a combination thereof. In an illustrative embodiment, the communication component 1918 receives a broadcast signal or broadcast related information from an external broadcast management system via a broadcast channel. In an illustrative embodiment, the communication component 1918 further includes a near field communication (NFC) module to facilitate short-range communication. For example, the NFC module can be implemented based on a radio frequency identification (RFID) technology, an infra-red data association (IrDA) technology, an ultra-wideband (UWB) technology, a Bluetooth (BT) technology or other technologies.

In an illustrative embodiment, the electronic device 1900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to perform the above methods for generating the status report or setting the timer.

In an illustrative embodiment, there is also provided a non-transitory machine-readable storage medium including instructions, such as a memory 1904 including instructions, the instructions are executable by the processor 1920 of the electronic device 1900 to complete the above methods for generating the status reports or setting the timers. For example, the non-transitory computer-readable storage medium may be a ROM, a random access memory (RAM), a CD-ROM, a magnetic tape, a floppy disk, an optical data storage device, etc.

Correspondingly, the present disclosure also provides an information configuration apparatus, including:

a processor; and a memory configured to store instructions executable by the processor, wherein the processor is configured to execute any of the information configuration methods.

As shown in FIG. 20, FIG. 20 is a schematic structural diagram of an information configuration apparatus 2000 according to an illustrative embodiment. The apparatus 2000 may be provided as a network device. Referring to FIG. 20, the apparatus 2000 includes a processing component 2022, a radio transmission/reception component 2024, an antenna component 2026, and a signal processing part specific to the radio interface. The processing component 2022 may further include one or more processors.

One of the processors in the processing component 2022 may be configured to perform any one of the above information configuration methods.

After considering the description and practicing the present disclosure disclosed herein, those skilled in the art will readily contemplate other embodiments of the present disclosure. The present disclosure is intended to cover any variations, uses, or adaptions of the present disclosure that conform to the general principles of the present disclosure and include common knowledge or conventional technical means in the technical field which are not disclosed in the present disclosure. It is intended that the description and embodiments shall be considered as exemplary only, and the true scope and spirit of the present disclosure are indicated by the appended claims.

The present disclosure is not limited to the precise structures that have been described above and shown in the accompanying drawings, and various modifications and changes can be made without departing from the scope thereof. The scope of the present disclosure is defined only by the appended claims.

What is claimed is:

1. A method for generating a status report, comprising:

in response to determining, by a terminal, that a reassembly timer expires and that a status prohibition timer is not started, generating, by the terminal, a Radio Link Control (RLC) status report, submitting, by the terminal, the RLC status report to a Media Access Control (MAC) layer, and then starting, by the terminal, the status prohibition timer; and during running of the status prohibition timer, in response to determining, by the terminal, that a new RLC status report is triggered and that a target condition for generating the new RLC status report is met, generating, by the terminal, the new RLC status report, and submitting, by the terminal, the new RLC status report to the MAC layer.

2. The method according to claim 1, wherein after generating the new RLC status report and submitting the new RLC status report to the MAC layer, the method further comprises:

restarting, by the terminal, the status prohibition timer.

3. The method according to claim 1, wherein the target condition comprises at least one of:

the triggered new RLC status report comprises a missing target RLC Service Data Unit (SDU) or target SDU segment, wherein the target RLC SDU is a RLC SDU that was not included in the RLC status report, which was submitted to the MAC layer in response to determining that the reassembly timer expires and that a status prohibition timer is not started, and the target SDU segment is an SDU segment that was not included in the RLC status report, which was submitted to the MAC layer in response to determining that the reassembly timer expires and that a status prohibition timer is not started;

a largest Serial Number (SN) of RLC SDUs that are not successfully received by the terminal correspondingly indicated by the triggered new RLC status report is different from a largest SN of RLC SDUs that are not successfully received by the terminal correspondingly indicated by the RLC status report, which was submitted to the MAC layer in response to determining that the reassembly timer expires and that a status prohibition timer is not started; or a SN of a next RLC SDU to be received by the terminal correspondingly indicated by the triggered new RLC status report is different from a SN of a next RLC SDU to be received by the terminal correspondingly indicated by the RLC status report, which was submitted to the MAC layer in response to determining that the reassembly timer expires and that a status prohibition timer is not started.

4. The method according to claim 1, further comprising:

during running of the status prohibition timer, in response to determining, by the terminal, that a new RLC status report is triggered and at least one of the target conditions is not met, and after expiry of the status prohibition timer, generating, by the terminal, the new RLC status report and submitting the new RLC status report to the MAC layer, and restarting, by the terminal, the status prohibition timer.

5. The method according to claim 1, further comprising:

determining that a first enabling switch configured for the terminal by a network device is on, wherein the first enabling switch is configured to enable at least one of following statuses:

status reporting during running of a Select Retransmission (SR) prohibition timer is allowed;

the status prohibition timer corresponding to a first duration is configured, wherein the first duration is greater than a Round Trip Time (RTT);

the status prohibition timer corresponding to the first duration and the reassembly timer corresponding to a second duration have been configured, wherein the second duration is smaller than a first preset value;

Non-terrestrial communication (NTN) has been configured;

NTN corresponding to a RTT of a third duration has been configured, wherein the third duration is greater than a second preset value; or Hybrid Automatic Repeat reQuest (HARQ) is disabled.

6. An apparatus for generating a status report, comprising:

a processor; and a memory configured to store instructions executable by the processor, wherein the processor is configured to perform the method for generating a status report according to claim 1.

7. A method for generating a status report, comprising:

after expiry of a target reassembly timer, generating, by a terminal, a Radio Link Control (RLC) status report and submitting, by the terminal, the RLC status report to a Media Access Control (MAC) layer, wherein the target reassembly timer is any one of one or more reassembly timers that have been started; and during running of the target reassembly timer, in response to that a RLC SDU corresponding to a SN indicated by a trigger associated with the target reassembly timer is not within a reception window and the SN indicated by the trigger associated with the target reassembly timer is different from a sum of a SN of a next RLC SDU to be received by the terminal and a number of SNs of SDUs included in the reception window, stopping, by the terminal, the target reassembly timer.

8. The method according to claim 7, further comprising:

after the expiry of the target reassembly timer, determining, by the terminal, a target Serial Number (SN) associated with the target reassembly timer, wherein the target SN is a largest SN of RLC Service Data Units (SDUs) that are not successfully received by the terminal and are reported in the RLC status report.

9. The method according to claim 8, wherein the target SN is greater than or equal to a SN of a first missing RLC SDU or a first missing SDU segment indicated by a trigger associated with the target reassembly timer.

10. The method according to claim 9, further comprising:

after the expiry of the target reassembly timer, not updating the trigger associated with the target reassembly timer.

11. The method according to claim 7, further comprising:

during running of the target reassembly timer, in response to determining that there is no missing RLC SDU or SDU segment in RLC SDUs corresponding to a target SN range, stopping, by the terminal, the target reassembly timer;

wherein the target SN range is a SN range from a first SN to a second SN, the first SN is a SN of a next RLC SDU to be received by the terminal, and the second SN is a SN indicated by a trigger associated with the target reassembly timer.

12. The method according to claim 11, further comprising:

restarting, by the terminal, a trigger prohibition timer, wherein the trigger prohibition timer is configured to prohibit triggering to start a new reassembly timer during running of the trigger prohibition timer.

13. The method according to claim 7, further comprising:

in response to determining that there is a missing RLC SDU or SDU segment in a received acknowledgment mode (AMD) Packet Data Unit (PDU), triggering, by the terminal, to start a reassembly timer; and during running of at least one reassembly timer that has been started, in response to determining that there is a missing RLC SDU or SDU segment in a newly received AMD PDU, triggering, by the terminal, to start a new reassembly timer in parallel.

14. The method according to claim 13, further comprising:

in response to that any reassembly timer is triggered to start, determining, by the terminal, that a SN indicated by a trigger associated with the reassembly timer is a largest SN of following RLC SDUs to be received by the terminal at the time when the reassembly timer is triggered to start.

15. The method according to claim 13, further comprising:

in response to that any reassembly timer is started, starting, by the terminal, a trigger prohibition timer, wherein the trigger prohibition timer is configured to prohibit triggering to start a new reassembly timer during running of the trigger prohibition timer; and after expiry of the trigger prohibition timer, allowing, by the terminal, to trigger to start a new reassembly timer, wherein the trigger prohibition timer comprises any one of:

a status prohibition timer, or a dedicated timer used to prohibit triggering to start a new reassembly timer during the running.

16. The method according to claim 7, wherein before generating the Radio Link Control (RLC) status report and submitting the RLC status report to the Media Access Control (MAC) layer after the expiry of the target reassembly timer, the method further comprises:

determining that a second enabling switch configured for the terminal by a network device is on, wherein the second enabling switch is configured to enable at least one of following statuses:

parallel reassembly timers are allowed or multiple reassembly timers are allowed;

the reassembly timer corresponding to a fourth duration has been configured, wherein the fourth duration is determined based on a RTT, a number of HARQ retransmissions, and a scheduling offset;

the reassembly timer corresponding to the fourth duration and the status prohibition timer corresponding to a fifth duration have been configured, wherein the fifth duration is smaller than a third preset value;

Non-terrestrial communication (NTN) has been configured;

NTN corresponding to a RTT of a third duration has been configured, wherein the third duration is greater than a second preset value; or Hybrid Automatic Repeat reQuest (HARQ) is enabled.

17. An apparatus for generating a status report, comprising:

a processor; and a memory configured to store instructions executable by the processor, wherein the processor is configured to perform the method for generating a status report according to claim 7.

18. A method for setting a timer, comprising:

in response to determining, by a terminal, that there is a missing Radio Link Control (RLC) Service Data Unit (SDU) or SDU segment in a received Packet Data Unit (PDU) in a target mode, triggering, by the terminal, to start a reassembly timer;

during running of at least one reassembly timer that has been started, in response to determining, by the terminal, that there is a missing RLC SDU and/or SDU segment in a newly received PDU in the target mode, triggering, by the terminal, to start a new reassembly timer in parallel; and during running of a target reassembly timer, in response to that a RLC SDU corresponding to a SN indicated by a trigger associated with the target reassembly timer is not within a reception window and the SN indicated by the trigger associated with the target reassembly timer is different from a sum of a SN of a next RLC SDU to be received by the terminal and a number of SNs of SDUs included in the reception window, stopping the target reassembly timer, wherein the target reassembly timer is any one of the at least one reassembly timer that has been started.

19. An apparatus for setting a timer, comprising:

a processor; and a memory configured to store instructions executable by the processor, wherein the processor is configured to perform the method for setting a timer according to claim 18.

\* \* \* \* \*